Sept. 20, 1932.  C. A. TODD  1,878,553
COMBINATION GARDEN HAND TOOL
Filed Dec. 21, 1931
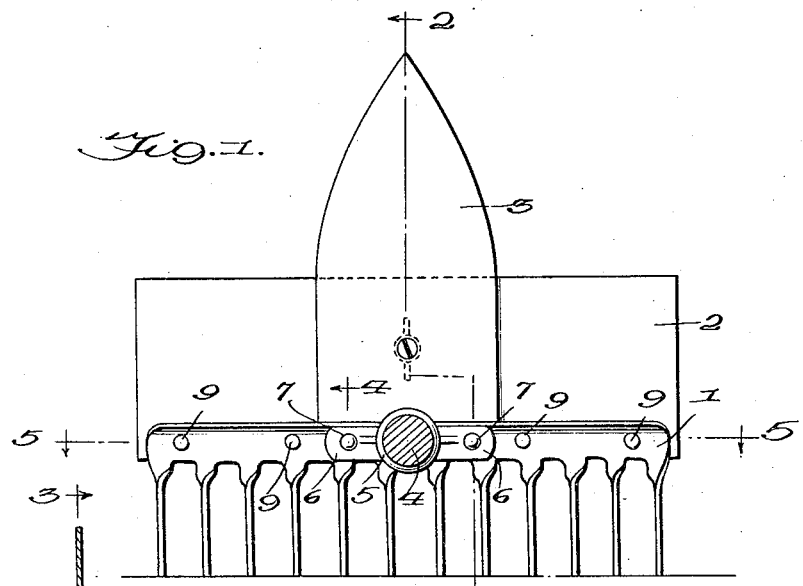
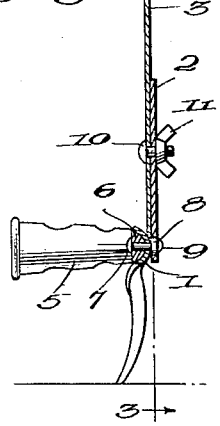
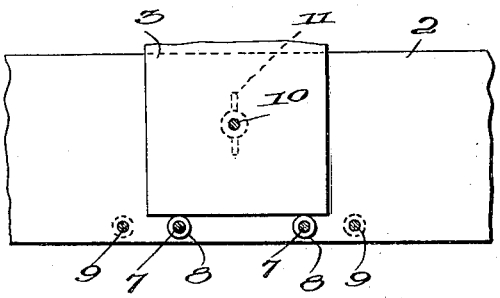
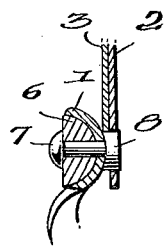
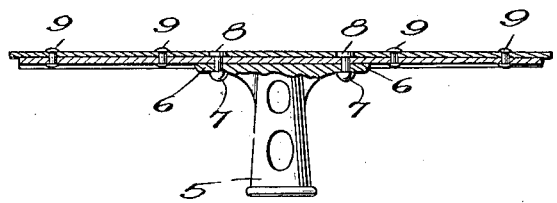
Inventor
Charles A. Todd,
By Richard E. Babcock
Attorney Patented Sept. 20, 1932

1,878,553

UNITED STATES PATENT OFFICE

CHARLES A. TODD, OF OWENSBORO, KENTUCKY

COMBINATION GARDEN HAND TOOL

Application filed December 21, 1931. Serial No. 582,415.

This invention relates to combination hand garden tools.

The objects of the invention are to provide a tool head having oppositely presented portions embodying on the one hand a rake element and on the other a broad blade which may be used as a hoe or scraper, in combination with a pointed blade capable of serving as a hoe or a plow for forming furrows and also available for cultivating around hilled plants and for purposes of general utility; to so secure the rake portion and the scraper portion together and to so relate them to the handle as to minimize the leverage exerted by said portions against their means of connection with said handle; to so connect said portions to each other as to greatly reduce or eliminate vibration at the point of connection between said portions when the tool is being used as a hoe or being subjected to jars; to provide simple means for detachably securing the cultivator point to the hoe or scraper blade; to provide means for supporting the cultivator blade in position against displacement under impact when used as a hoe and to prevent its displacement when used as a cultivator or for running a furrow, and to so relate said means to the axis of the handle as to properly distribute the weight of the tool and avoid the exertion of turning leverage by said plow blade about the axis of said handle; to provide means equi-distantly spaced from, and on opposite sides of, the axis of the handle, in combination with means having its axis lying in the same vertical plane as the axis of said handle and equi-distantly disposed between said first mentioned means for mounting and holding said plow blade in proper position; to utilize the means securing the handle socket flanges to the rake portion for supporting the socket end portion of the plow blade; to provide a construction wherein the axes of the fastening means between the socket flanges and the rake portion and between the rake portion and the scraper blade portion will all lie in a single horizontal plane coincident with the horizontal plane passing through the axis of the handle and wherein the removable plow blade as operatively mounted will exert its end thrust at a point substantially coincident with said horizontal plane at points equi-distantly disposed on opposite sides of the axis of said handle.

In the accompanying drawing:

Figure 1 represents a rear elevation of a combination tool embodying my invention;

Figure 2, a section on the line 2—2 of Fig. 1, looking in the direction of the arrows;

Figure 3, a section on the line 3—3 of Fig. 2, looking in the direction of the arrows;

Figure 4, a fragmentary sectional view, on an enlarged scale, on the line 4—4 of Fig. 1, looking in the direction of the arrows; and Figure 5, a section on the line 5—5 of Fig. 1, looking in the direction of the arrows.

In the accompanying drawing, Figures 1, 2, 3 and 5 are made to a scale of one-third full size from an actual commercial embodiment of the invention, while Fig. 4 is made on an enlarged scale without any definite proportional relation to said actual commercial embodiment.

Referring now in detail to the drawing, 1 indicates the rake portion of usual or conventional rake construction having the usual tines and the usual connecting head or bar portion which will have its rear face curved or arcuate in vertical section; 2 designates the scraper blade portion, which will be a flat piece of sheet steel of suitable gage or thickness such as to be suited for work of the nature intended; 3 designates the pointed cultivator or plow blade which will be flat and normally will be of the same material of the same gage or thickness as the blade 2; 4 designates the usual long wooden handle such as now commonly in use, in connection with rakes and hoes and tools of this type; 5 designates the usual socket in which the end of the handle is to be inserted and secured in usual or known manner; and 6 designates the pair of socket flanges extending laterally in opposite directions from diametrically opposite portions of the socket 5 and having their outer end faces convex in cross section and corresponding in shape to the opposed face of the adjacent portion of the horizontal upper bar or connecting head of the rake 1 so as to be received thereby.

Rivets 7 respectively passing through said flanges 6 in the adjacent portions of said head of the rake 1 serve to secure the socket 5 firmly to the rake head or horizontal bar and in accordance with usual practice the ends of these rivets 7 are upset. However, in addition to being upset, the forward ends of the rivets 7 are enlarged and of cylindrical form and substantial length so as to extend through registering perforations in the scraper blade 2 and to afford supporting buttons or stop shoulders for the plow or cultivator blade 3. Said rivets 7 are equi-distantly disposed on opposite sides of the axis of the socket 5 and in the horizontal plane thereof.

The rake portion 1 and scraper blade portion 2 are properly centered with relation to each other as illustrated in Figures 1 and 5, and are then secured together by means of rivets 9 passing through registering perforations in the adjacent portions of said rake portion 1 and scraper blade 2, said rivets 9 having their axes disposed in the common horizontal plane of the axes of the rivets 7 and the handle 4 and preferably being arranged in pairs equi-distantly disposed from, and on opposite sides of, the axis of the socket 5, that is to say the two extreme outer rivets 9 are disposed on opposite sides of, and at the same distance from, the axis of the socket 4 and the inner rivets 9 are similarly related to the axis of the socket 4, there being only two pairs of such rivets 9 in the embodiment illustrated. Also, the pair of inner rivets 9 will preferably be disposed closely adjacent the rivets 7, as illustrated, to firmly secure the medial portion of the scraper blade 2 to the rake portion 1. The portion of the scraper blade 2 between the inner pair of rivets 9 will be formed with a pair of enlarged perforations having axes disposed in the horizontal plane intersecting the axis of the socket 5 and the axes of the rivets 7 and 9 and will snugly receive the enlarged cylindrical portions 8 of the rivets 7, which enlarged heads 8 will cooperate with the rivets 9 in sustaining the thrust of the scraper blade 2 when the same is used for hoeing or chopping operations.

The scraper blade 2 is formed with a perforation disposed equi-distantly between the said enlarged perforations receiving heads 8 and disposed in a vertical direction at a distance from the axis of the socket 5 approximately equal to the distance between the said heads 8 or slightly less, and having its axis lying in the same vertical plane as the axis of said socket 5, said perforation being adapted to receive the removable bolt 10 passing through the registering perforation in the plow or cultivator blade 3 and receiving a nut 11 to detachably secure said plow or cultivator blade 3 in proper operative position. The socket or supporting end of said plow or cultivator blade 3 is formed with a straight edge adapted to rest upon and be supported by the enlarged heads 8 at points equi-distantly disposed from the vertical central line of said blade 3, and the perforation in said blade 3 has its axis intersected by said vertical central line of said blade 3 and is so spaced in a vertical direction from the straight end edge of the blade 3 that as mounted in operative position said straight end edge will engage said enlarged ends 8.

Preferably the tool as a whole will be constructed as illustrated with the intention that the plate 3 when used shall be disposed in engagement with the rear face of the blade 2 and with the straight edge end portion of the blade 3 disposed between the opposed faces of the blade 2 and the rake portion 1, and with the front face of plate 3 in engagement with the rear face of plate 2 and the rear face of the straight edge end portion of blade 3 in engagement with the adjacent curved front face of rake portion 1 as illustrated in Figures 2 and 4, or substantially in engagement therewith.

The rake portion 1 will preferably be of heavy sheet metal stock and will be formed by well known sheet metal die stamping and forming operations.

What I claim is:

1. A cultivator attachment for a combined hoe and rake comprising a flat blade with a rounded end, the lower end adapted to be held by the joint between the rake and hoe, and a detachable fastening means between the blade and hoe.

2. A cultivator attachment for a combined hoe and rake comprising a flat blade with a rounded end, the lower end adapted to be held by the joint between the rake and hoe, and a fastening means between the blade and hoe.

In testimony whereof, I have signed my name to this specification at Owensboro, Kentucky, this 18th day of December, 1931.

CHARLES A. TODD.